Oct. 10, 1933.  J. C. CROWLEY  1,930,039
PRESSURE GAUGE
Filed Nov. 10, 1931
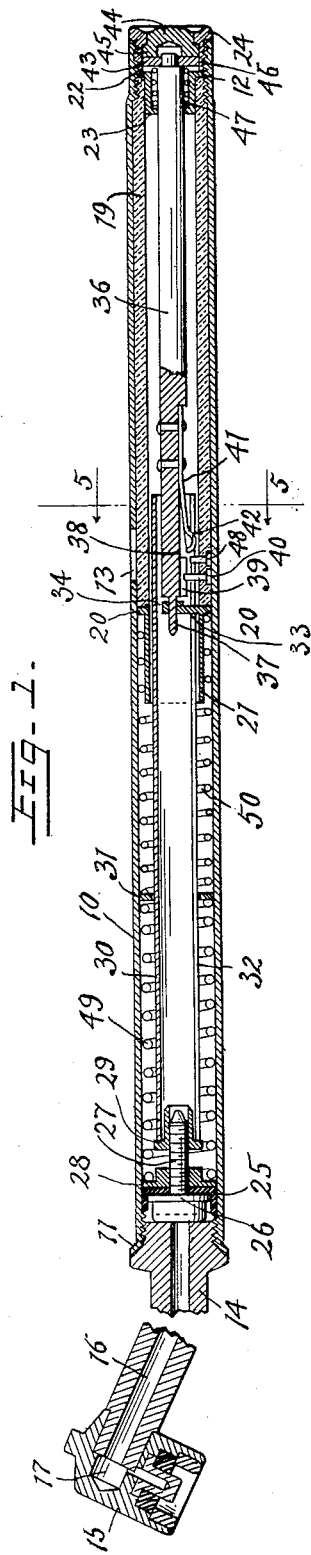
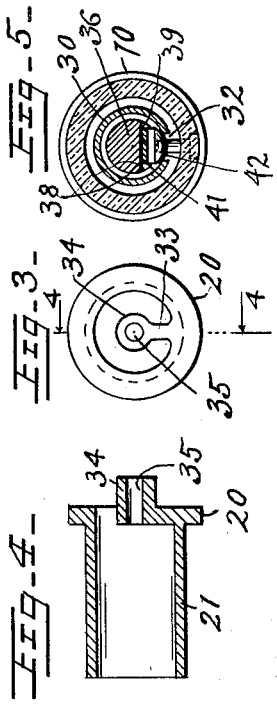
Inventor
JOHN C. CROWLEY.

Patented Oct. 10, 1933

1,930,039

UNITED STATES PATENT OFFICE 1,930,039

PRESSURE GAUGE

John C. Crowley, Cleveland Heights, Ohio, assignor to The Dill Manufacturing Company, Cleveland, Ohio, a corporation of Ohio Application November 10, 1931
Serial No. 574,104

6 Claims. (Cl. 73—111)

This invention relates to a pressure gauge and particularly to a pressure gauge especially adapted for determining the inflation pressures of pneumatic tires and similar articles.

Since pneumatic tires of the balloon type have low inflation pressures while the ordinary type of tires have high inflation pressures, it has been necessary to employ a different gauge for testing the inflation pressures in low pressure balloon tires than can be used for testing the inflation pressures of the ordinary or high pressure tires.

An object of the present invention is to provide a pressure gauge for testing the inflation pressures of pneumatic tires and other similar articles that is universal in character in that the gauge may be used to test inflation pressures of either low pressure balloon tires or high pressure tires such as the ordinary form of pneumatic tires.

A further object is to provide a pressure gauge of the character specified in the above mentioned object, which is of simple construction and which is efficient and accurate in use.

A still further object is to provide a pressure gauge of the character set forth, in which the operating parts of the gauge are completely housed and protected from weather and dirt.

Additional objects and advantages will become apparent hereinafter during a detailed description of an embodiment of the invention that is to follow.

Referring to the drawing illustrating such embodiment of the invention,

Figure 1 is an enlarged longitudinal sectional view through the gauge, the air chuck extension portion of the gauge being broken away intermediate the ends of such portion;

Fig. 2 is a side elevational view of the gauge shown in Fig. 1, but disclosing a different form of air chuck;

Fig. 3 is an enlarged detail elevational view of a part of the gauge;

Fig. 4 is a sectional view taken substantially on line 4—4 of Fig. 3; and

Fig. 5 is an enlarged transverse sectional view taken substantially on line 5—5 of Fig. 1.

Referring to the drawing and particularly to Fig. 1 thereof, the gauge will be seen to comprise a tubular casing 10 formed of metal, hard rubber or other suitable material and having an interiorly threaded flared end 11 and an interiorly threaded reduced end 12. The casing 10 is further provided intermediate its ends 11 and 12 with an opening 13 constituting a window through which the indicia carrying member of the gauge, in this instance a movable plunger, may be seen and the gauge reading taken.

The flared end 11 of the casing 10 has screwed therein one end of an air chuck extension 14, as is well understood, the other end of the extension 14 fitting within an air chuck head 15, the longitudinal bore 16 through the extension 14 communicating with a recess and passage in the air chuck head 15 and indicated generally at 17. The construction of the air chuck need not be set forth in detail since the same forms no part of the present invention and is well understood in the art.

In Fig. 2 the extension 14 is disclosed as having an air chuck head 18 secured to its outer end and of a different type than the air chuck head shown in Fig. 1, it being noted that the head 18 is provided with a pair of air chucks to facilitate the application of the gauge to valve stems of pneumatic tires used on wheels of the dual type. The construction of the air chucks, shown in Fig. 2, is fully set forth in my co-pending application Serial No. 508,105, filed January 12, 1931, and will not be referred to herein.

A transparent cylinder 19, preferably formed of glass, is arranged within the tubular casing 10 with a tight fit therein and closes the opening 13 in the casing. One end of the transparent cylinder 19 abuts an annular flange 20 formed on one end of a sleeve 21, later to be referred to, while the other end of the cylinder 19 engages an annular flange 22 at the open end of a cup-shaped member 23, also later to be referred to, such flange 22 being held in tight engagement with the end of the cylinder by a nut 24 screwed into the reduced interiorly threaded end 12 of the casing 10.

A piston is arranged within the casing 10 adjacent the end 11 thereof and comprises a flexible cup-shaped washer 25 clamped between the flanged head 26 of the screw 27 and a clamping nut 28 arranged on the screw 27. The end of the screw 27 is threadedly connected with a flanged bushing 29, the flange of which abuts one end of a tubular plunger 30 that is arranged within the casing and is of such diameter that there will be a circular space between the casing and the plunger in which to arrange the gauge springs, as will later be explained.

The tubular plunger 30 is of such length that its end, opposite to the end which abuts the bushing 29, is located approximately beneath the opening or window 13 in the casing when the piston is in the position shown in Fig. 1. That side of the tubular plunger 30 adjacent to the opening or window 13 may be provided with suitable indicia in terms of fluid pressure, as is well understood in the art. The plunger 30 passes through the opening in a washer 31, normally located intermediate the ends of the plunger and having a sliding fit in the casing 10 and through the sleeve 21 which is fixed in the casing 10. It will be noted, referring to Fig. 5 of the drawing, that the plunger 30 is provided with a longitudinally extending slot 32 located diametrically opposite to the side of the plunger upon which the indicia would be arranged and that the flanged end of the sleeve 21 has an inwardly extending lug 33, the upper end of which is located approximately at the longitudinal center line of the sleeve and has an axially extending cylindrical portion 34 provided with an opening 35 extending therethrough. The lug 33, or cylindrical portion 34 thereof, extends into the plunger 30 through the slot 32 of the plunger, from which it will be seen that the plunger may have sliding movement with respect to the sleeve 21.

A rod 36 is movably arranged within the gauge and has a reduced end 37 slidably fitting the opening 35 in the cylindrical portion 34 of the lug 33 of the sleeve 21, while inwardly of the reduced portion 37 the rod 36 is provided with a flat cut-out part 38. The rod 36, intermediate the reduced end portion 37 and the flat cut-out part 38, has a longitudinally extending slot 39 on its underside within which engages a pin 40 carried by the cylinder 19 in order to prevent rotation of the rod 36. Secured to the flat cut-out part 38 of the rod is a flat spring 41 having a cup-shaped deflected end 42 extending into the plunger 30 and frictionally engaging the inner surface of the plunger at the opposite sides of the slot 32.

The rod 36 extends through an opening in the bottom of the cup 23 and has its end secured to the washer 43. A push button 44 is arranged within the nut 24 at the end 12 of the casing and has a flange 45 engaging the washer 43 and an internal flange 46 on the nut 24. A coil spring 47 is arranged in the cup 23 around the rod 36 and has one end abutting the bottom of the cup and its other end abutting the washer 43. It will be seen that when the push button 44 is depressed the spring 47 will be compressed and the rod 36 moved inwardly in the gauge, the reduced end portion 37 of the rod sliding in the opening 35 in the circular portion of the sleeve 21.

The circular portion 34 is of such longitudinal length that the rod 36 may move inwardly a sufficient distance before the shoulder, formed by the rod at the end of the portion 37, engages with the end of the circular portion 34 of the sleeve to permit a second pin 48, fixed in the cylinder 19 and extending into the plunger 30 through the slot 32, to engage with the cup-shaped end 42 of the spring 41 and deflect the spring inwardly to release the frictional engagement of the cup-shaped end 42 with the inner surface of the plunger. Of course, as soon as the button 44 is released, the spring 47 will return the rod to its original position and the cup-shaped end 42 of the spring 41 will again frictionally engage the inner surface of the plunger.

A coil spring 49, in this instance the high pressure spring, is arranged within the casing 10 surrounding the plunger 30 and has one end abutting the clamping nut 23 of the piston while its other end abuts the washer 31. A second and smaller coil spring 50, in this instance the low pressure spring, is arranged in the casing surrounding the plunger 30 and the sleeve 21, the opposite ends of the spring 50 abutting the washer 31 and the flange 20 of the sleeve 21 respectively.

The gauge parts being in the position shown in Fig. 1 and the air chuck head 15 being applied to a valve stem and the valve of the valve insides arranged in the valve stem unseated by the pin of the air chuck in the head 15, the air in the tire will pass through the passage and recess 17 in the head and through the bore 16 in the air chuck extension 14 and will act on the piston of the gauge to move the piston inwardly of the gauge, which movement, of course, will move the plunger 30 toward the right hand end of the gauge, as viewed in the drawing. The springs 49 and 50 are so calibrated that the spring 50, up to a certain predetermined pressure, will first be compressed while the spring 49 will be of such strength that it will act to directly transmit the movement of the piston to the washer 31 and against the spring 50. As soon as the pressure upon the piston reaches the predetermined pressure, referred to above, the spring 50 will have been compressed to such an extent that the washer 31 will engage the end of the sleeve 21 and will be held thereby against further movement. The pressure on the piston going beyond the predetermined pressure referred to, the tension of the spring 49 will be overcome and further movement of the piston will act to compress the same.

By way of example, it will be assumed that no substantial compression of the spring 49 will occur until the pressure upon the piston has reached fifty (50) pounds or more, while pressure values below fifty (50) pounds will act to compress the spring 50. The pressure value of fifty (50) pounds is referred to herein since the inflation pressures of balloon tires rarely exceed that value and a range is thus provided for the spring 50 which will cover the various sizes of balloon tires. It will be understood, of course, that when the gauge is used to test the inflation pressure of tires other than balloon tires, but which do not exceed fifty (50) pounds pressure, that the operation of the gauge will be the same.

The amount of movement of the plunger 30 occasioned by the movement of the piston will be indicated by the indicia arranged on the plunger and visible through the opening 13 in the casing and the transparent cylinder 19 and since such indicia is in terms of fluid pressure, the inflation pressure of the gauge will readily show the inflation of the tire being tested.

As previously pointed out, the plunger 30 will remain in the position to which it has been moved by the frictional engagement of the cup-shaped member 42 of the spring 41 thereon, with the result that the gauge may be removed from the valve stem before reading the gauge. As soon as the gauge reading has been taken the button 44 is depressed and the frictional engagement between the spring 41 and the plunger is released to allow the plunger to return to its original position by gravity. It will be understood, of course, that the frictional engagement between the spring 41 and the plunger, while sufficient to hold the plunger in a position to which it has been moved, is coordinated with the springs 49 and 50 to the end that the correct amount of inward movement of the plunger will be brought about under the different pressures.

Although a preferred embodiment of the invention has been illustrated and disclosed herein, it should be understood that the invention is susceptible of various modifications and adaptations within the scope of the appended claims.

Having thus described my invention, I claim:

1. In a pressure gauge, a casing, a piston arranged therein, a plunger movable by said piston, a fixed abutment, a movable abutment, a coil spring surrounding said plunger and abutting said piston and said movable abutment, a second coil spring surrounding said plunger and abutting said fixed abutment and said movable abutment, said last named spring being weaker than said first named spring, friction means engaging said plunger, and means for releasing said friction means.

2. In a pressure gauge, a casing, a piston arranged therein, a plurality of springs of different strength opposing movement of said piston in one direction, a plunger movable by said piston during its movement in said direction, means for holding said plunger in the position to which it is moved by said piston, and means for releasing said last named means.

3. In a pressure gauge, a casing, a piston arranged therein, a plurality of springs of different strength opposing movement of said piston in one direction, a plunger movable by said piston during its movement in said direction and surrounded by said springs, means for holding said plunger in the position to which it is moved by said piston, and means for releasing said last named means.

4. In a pressure gauge, a casing, a piston arranged therein, a plurality of springs of different strength arranged in longitudinal extension of each other and opposing movement of said piston in one direction, a plunger movable by said piston during its movement in said direction, means for holding said plunger in the position to which it is moved by said piston, and means for releasing said last named means.

5. In a pressure gauge, a casing, a piston arranged therein, a plurality of springs of different strength opposing movement of said piston in one direction and arranged in longitudinal extension of each other, fixed and movable abutments, one of said springs abutting said piston and a movable abutment, another of said springs abutting a fixed abutment and a movable abutment, a plunger movable by said piston during its movement in said direction, means for holding said plunger in the position to which it is moved by said piston, and means for releasing said last named means.

6. In a pressure gauge, a casing, a piston arranged therein, a plunger movable by said piston, a fixed abutment, a movable abutment, a coil spring surrounding said plunger and abutting said piston and said movable abutment, a second coil spring surrounding said plunger and abutting said fixed abutment and said movable abutment, one of said springs being weaker than the other spring, means engaging said plunger to hold the same in the position to which it is moved by said piston, and means for releasing said last named means.

JOHN C. CROWLEY.